(12) United States Patent
Lou et al.

(10) Patent No.: US 9,916,063 B2
(45) Date of Patent: Mar. 13, 2018

(54) METHODS AND SYSTEMS FOR QUICK REPLY OPERATIONS

(71) Applicant: TENCENT TECHNOLOGY (SHENZHEN) COMPANY LIMITED, Shenzhen (CN)

(72) Inventors: Hongwei Lou, Shenzhen (CN); Tieming Huang, Shenzhen (CN); Jie Yang, Shenzhen (CN); Jun Liu, Shenzhen (CN); Jia Wang, Shenzhen (CN); Zuozhou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 497 days.

(21) Appl. No.: 14/592,513

(22) Filed: Jan. 8, 2015

(65) Prior Publication Data

US 2015/0121311 A1    Apr. 30, 2015

Related U.S. Application Data

(63) Continuation of application No. PCT/CN2014/081011, filed on Jun. 27, 2014.

(30) Foreign Application Priority Data

Jul. 15, 2013   (CN) .......................... 2013 1 0296230

(51) Int. Cl.
*G06F 3/0483*   (2013.01)
*G06F 3/0482*   (2013.01)
(Continued)

(52) U.S. Cl.
CPC ........ *G06F 3/0482* (2013.01); *G06F 3/04845* (2013.01); *G06F 3/04883* (2013.01); *G06F 3/04895* (2013.01)

(58) Field of Classification Search
CPC ............... G06F 3/0482; G06F 3/04845; G06F 3/04883; G06F 3/04895
See application file for complete search history.

(56) References Cited

U.S. PATENT DOCUMENTS

2009/0153288 A1*  6/2009  Hope ................... G06F 3/0482
                                                340/3.1
2010/0199180 A1*  8/2010  Brichter ............... G06F 3/0482
                                                715/702
(Continued)

FOREIGN PATENT DOCUMENTS

CN        102096488 A       6/2011
CN        102394981 A       3/2012
(Continued)

OTHER PUBLICATIONS

Taiwan Intellectual Property Office (TIPO) Office Action 1 for 103116139 dated May 22, 2015 pp. 1-10.
(Continued)

*Primary Examiner* — Jeffrey A Gaffin
*Assistant Examiner* — Mandrita Brahmachari
(74) *Attorney, Agent, or Firm* — Anova Law Group, PLLC

(57) ABSTRACT

A method and system for performing quick reply operations are disclosed. The method for quick reply operations includes displaying a text box; determining a display area of the text box; and receiving a user instruction. The method further includes determining whether the user instruction is a pull-down gesture in the display area of the text box; determining whether the pull-down gesture exceeds a threshold length; and displaying a quick reply text box. The method and system consistent with the present disclosure implement quick reply functions and improve the user experience for replying to various messages and postings.

16 Claims, 5 Drawing Sheets

(51) Int. Cl.
*G06F 3/0484* (2013.01)
*G06F 3/0489* (2013.01)
*G06F 3/0488* (2013.01)

(56) References Cited

U.S. PATENT DOCUMENTS

| | | | | |
|---|---|---|---|---|
| 2010/0325575 | A1* | 12/2010 | Platzer | G06F 3/04845 715/781 |
| 2013/0002802 | A1 | 1/2013 | Mock | |
| 2013/0271375 | A1* | 10/2013 | Griffin | G06F 3/0237 345/168 |
| 2014/0282005 | A1* | 9/2014 | Gutowitz | G06F 3/0488 715/728 |
| 2016/0188181 | A1* | 6/2016 | Smith | G06F 3/048 715/765 |

FOREIGN PATENT DOCUMENTS

| | | |
|---|---|---|
| CN | 102945134 A | 2/2013 |
| CN | 103076971 A | 5/2013 |
| CN | 103118189 A | 5/2013 |
| TW | 201131432 A | 9/2011 |
| TW | 201304494 A | 1/2013 |
| TW | 201312971 A | 3/2013 |

OTHER PUBLICATIONS

The World Intellectual Property Organization (WIPO) International Search Report for PCT/CN2014/081011 dated Sep. 29, 2014 pp. 1-4.

* cited by examiner

A to B:                                    DD/MM/YYYY/Time

Hi – everyone
Omitted here are a million words.
Thank you.

Figure 3A

⇩ Quick Reply

A to B:                                    DD/MM/YYYY/Time

Hi – everyone
Omitted here are a million words.
Thank you.

METHODS AND SYSTEMS FOR QUICK REPLY OPERATIONS

CROSS-REFERENCES TO RELATED APPLICATIONS

Related Applications

This application is a continuation application of PCT Patent Application No. PCT/CN2014/081011, filed on Jun. 27, 2014, which is based upon and claims the benefit of priority from Chinese Patent Application No. 201310296230.2, filed on Jul. 15, 2013, the entire content of both of which is incorporated herein by reference.

FIELD OF THE TECHNOLOGY

The present disclosure relates to communication technologies and, more particularly, to methods and systems for quick reply operations.

BACKGROUND

A reply operation is a specific interaction between a user and a computer. For example, a user may reply to an email message or an instant message. Often, the user interface provides the user with a link, an icon, or a button marked with the word "Reply." Specifically, a user terminal may display a link, an icon, or a button marked with "Reply." The user terminal may then wait for a user's input. The user input may be a mouse click on the link, icon, or button marked with "Reply." The user input may also be received through a touch screen display. Once the user terminal receives the user input, the user terminal may confirm that the user intends to reply to a message. The user terminal may then present a reply text box to the user. In an email system, the reply text box may be the text box for the user to compose a reply.

To trigger reply operations by the mouse or the touch screen, the user terminal requires that the user move the mouse or touch the touch screen with precise movements. As such, the reply may be complicated to initiate and the interactions between the user and the computer may be inefficient.

The disclosed method and system are directed to solve one or more problems set forth above and other problems.

BRIEF SUMMARY OF THE DISCLOSURE

Embodiments consistent with the present disclosure provide a method, system, mobile device, or a server for quick reply operations. Embodiments consistent with the present disclosure enable users to efficiently navigate the user interface and reply to messages and postings quickly.

One aspect of the present disclosure provides a method for quick reply operations. The method includes displaying a text box; determining a display area of the text box; and receiving a user instruction. The method further includes determining whether the user instruction is a pull-down gesture in the display area of the text box; determining whether the pull-down gesture exceeds a threshold length; and displaying a quick reply text box.

Moreover, the method may include displaying a user prompt icon for quick reply before the pull-down gesture reaches the threshold length. The user prompt icon may include an arrow. The method may further include rotating the arrow as the pull-down gesture lengthens. The arrow may point down at the beginning of the pull-down gesture and point up after the pull-down gesture exceeds the threshold length.

Another aspect of the present disclosure provides a user terminal for quick reply operations. The user terminal includes a displaying unit configured to display a text box; a display area determination unit configured to determine a display area of the text box; and an instruction receiving unit configured to receive a user instruction. The user terminal further includes an instruction confirming unit configured to determine whether the user instruction is a pull-down gesture in the display area of the text box, and to determine whether the pull-down gesture exceeds a threshold length. The user terminal also includes a display control unit configured to display a quick reply text box.

Further, the display control unit may be further configured to display a user prompt icon for quick reply before the pull-down gesture reaches the threshold length. The user prompt icon may include an arrow. In addition, the display control unit may be further configured to rotate the arrow as the pull-down gesture lengthens. In one example, the arrow may point down at the beginning of the pull-down gesture and point up after the pull-down gesture exceeds the threshold length.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

FIG. 3A is an exemplary user interface of an email system consistent with various embodiments of the present disclosure;

FIG. 3B is another exemplary user interface of an email system consistent with various embodiments of the present disclosure;

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
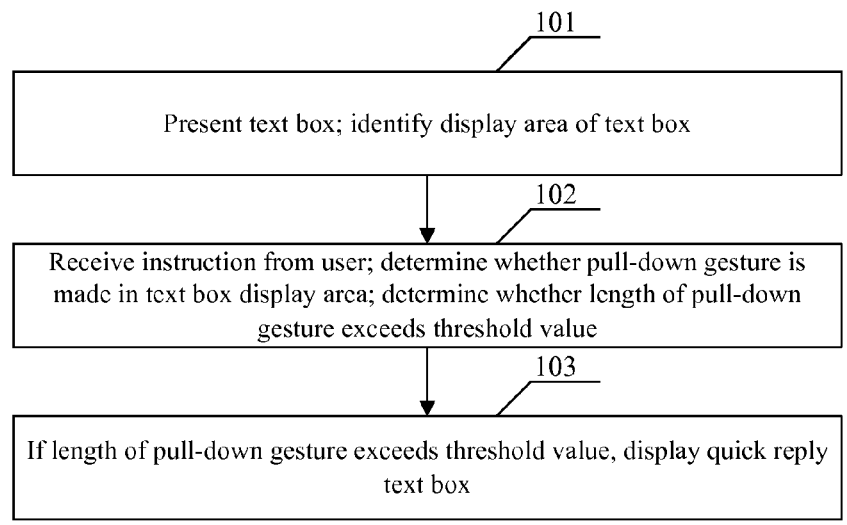
FIG. 1 is a flow chart of a method for implementing quick reply operations consistent with various embodiments of the present disclosure.

FIG. 1 shows a flow chart of a method for implementing quick reply operations. The method may be implemented by a smartphone, a laptop computer, or other smart devices/user terminals. The method shown in FIG. 1 includes steps 101-103.

In step 101, the user terminal may present a text box in the user interface. The user terminal may identify the display area of the text box. The text box may display text on which a user may reply or perform other actions. For example, a text box may be a box that displays the body of an email message, an instant message, or a paragraph of text to be reviewed or commented on. Obviously, these are only examples of text boxes. There may be different types of text boxes in different contexts.

In step 102, the user terminal may receive an instruction from the user. The user terminal may determine whether the instruction is a pull-down gesture made in the text box display area. The user terminal may further determine whether the length of the pull-down gesture is equal to or greater than a threshold value. To implement a more intuitive, quick, reply operation, once the user terminal receives a pull-down gesture from a user, the device may first determine whether the pull-down gesture is within the display area of the text box. If the pull-down gesture is in the display area, the device may display a quick reply prompt icon on the top part of the text box display area before the length of the pull-down gesture reaches the threshold value.

To help the user understand whether the pull-down gesture is sufficient to trigger the quick reply operation, and to quantify the pull-down gesture, the user terminal may implement the following steps. At the beginning of the pull-down gesture, the quick reply prompt icon may be a down-pointing arrow. As the pull-down gesture becomes longer, the arrow may rotate clockwise or counter clockwise. As the length of the pull-down gesture exceeds the threshold, the arrow may rotate to the up-pointing position.

In another example, as the user makes a pull-down gesture, the user terminal may move the text box display area as well as display the quick reply prompt icon. In addition, if the user stops the pull-down gesture before the length of the motion reaches the threshold value, the user terminal may revert to the previous display of the text box, without the quick reply prompt icon. In another example, the user terminal may show the animation of the movements of the text box display area moving back from the temporarily pull-down position (but not enough for the quick reply operation) to its original position.

In step 103, once the user terminal determines that the length of the pull-down gesture equals to or exceeds the threshold value, the user terminal may display the quick reply text box. Depending on the type of the original text box, the quick reply text box may be a reply message text box for an email message or for an instant message. The quick reply text box may also be a commenting text box.

Embodiments consistent with the present disclosure enable a user terminal to receive a quick reply instruction from a user and implement the corresponding operations. The user does not need to use a mouse or a touch screen to click on a text link, an icon, or a button. Embodiments consistent with the present disclosure provide a user-friendly quick reply operation and improve the interactions between a user and a user terminal.

Figure 2:
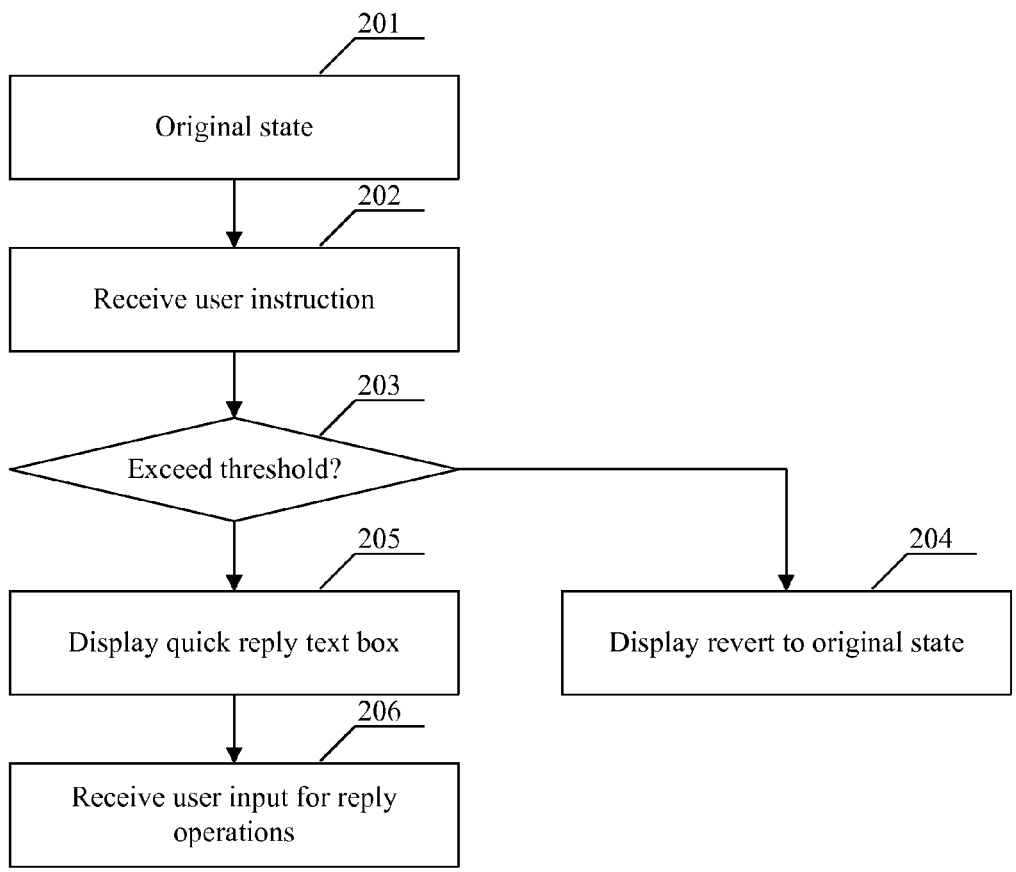
FIG. 2 is another flow chart of a method for implementing quick reply operations consistent with various embodiments of the present disclosure.

FIG. 2 is another flow chart of a method for implementing quick reply operations. As shown in FIG. 2, a user may receive an email message. The user may use a pull-down gesture in the display area of the email message to initiate a quick reply operation. The user terminal may move the text box for the original email message with the user's pull-down gesture by following the length of the pull-down gesture. The user terminal may set a threshold value for the pull-down gesture. If the user stops the pull-down gesture before the length of the pull-down gesture reaches the threshold value, the user terminal will return the text box for the original email message to its original position. If the user stops the pull-down gesture after the length of the pull-down gesture reaches the threshold, the device may display a reply text box. The process as shown in FIG. 2 includes steps 201-206.

In step 201, the user terminal may display a received email message in a text box as shown in FIG. 3A. In this step, the user terminal displays the email message. The display may include the subject lines and the body of the email message. The subject lines may include the time (month/day/year), sender, and receiver of the email message. The body of the message may be the content below the subject lines. As shown in FIG. 3A, the exemplary body of message is as follows:

"Hi—everyone.

Omitted here are a million words.

Thank you."

In step 202, the user terminal may receive the user instruction to perform a quick reply operation. For example, if the user moves the mouse over the display area for the body of the email message, the user may then use a pull-down gesture in the display area. As shown in FIG. 3B, the user terminal may move the display of the email message downward and display a quick reply text box. The user terminal may also display a text such as "Quick Reply" in the text box. The user terminal may further display an arrow on the left side of the "Quick Reply" text. The down-pointing arrow below the body of the email represents the direction of the user's pull-down gesture.

Figures 3C, 3D:
FIG. 3C is another exemplary user interface of an email system consistent with various embodiments of the present disclosure.
FIG. 3D is another exemplary user interface of an email system consistent with various embodiments of the present disclosure.

At the beginning of the pull-down gesture, the original email message is pulled down in response to the pull-down gesture, and the quick reply prompt icon may be a down-pointing arrow. The user terminal may display the "Quick Reply" text on the right side of the quick reply prompt icon (arrow). As the pull-down gesture becomes longer, the arrow may rotate clockwise or counter clockwise. The degree of the rotation increases as the pull-down gesture extends longer. As shown in FIG. 3C, as the length of the pull-down gesture exceeds the threshold, the arrow may rotate to the up-pointing position.

In step 203, after the user completes the pull-down gesture, the user terminal may determine whether the pull-down gesture has reached the threshold length. If not, the user terminal executes step 204. Otherwise, the user terminal executes step 205.

In step 204, the user terminal displays the original email at the original position. That is, when the user stops the pull-down gesture before reaching the threshold length (the arrow next to the "Quick Reply" has not rotated 180 degrees), the user terminal would revert to the original email message display as shown in FIG. 3A.

In step 205, the user terminal may display the quick reply text box. After the pull-down gesture reaches the threshold length (the arrow next to the "Quick Reply" has rotated 180 degrees), the user may stop the pull-down gesture. The user terminal may display the quick reply text box, as shown in FIG. 3D. The user terminal may also display a line, "To: A," below the reply text box to show the target of the reply message. The user terminal may also show a "Send" and a "Cancel" button to facilitate the user's operations.

In step 206, the user terminal may receive the text of the reply message entered by the user. The user terminal may also receive an instruction to send the reply from the user and then send the reply message.

The above example describes the example of replying to an email message. That is, the user terminal displays a reply text box based on a user's pull-down gesture. Similarly, the user terminal may implement the same design for other functions such as "Reply All," "Comment," etc. The user terminal may display a reply-all or a comment text box based on a user's pull-down gesture.

In the above example, the user terminal determines whether the quick reply screen should be displayed based on a threshold length of the pull-down gesture, or the rotation of the user prompt icon (arrow rotating 180 degrees). Similarly, the user terminal may determine whether the quick reply screen should be displayed based on other criteria, such as whether the pull-down gesture has reached certain part of the display, etc.

Embodiments consistent with the present disclosure enable a user terminal to receive a quick reply instruction from a user and implement the corresponding operations. The user does not need to use a mouse or touch screen to click on a text link, an icon, or a button. Embodiments consistent with the present disclosure provide a more user-friendly quick reply operation and improve the interactions between a user and a user terminal.

Figure 4:
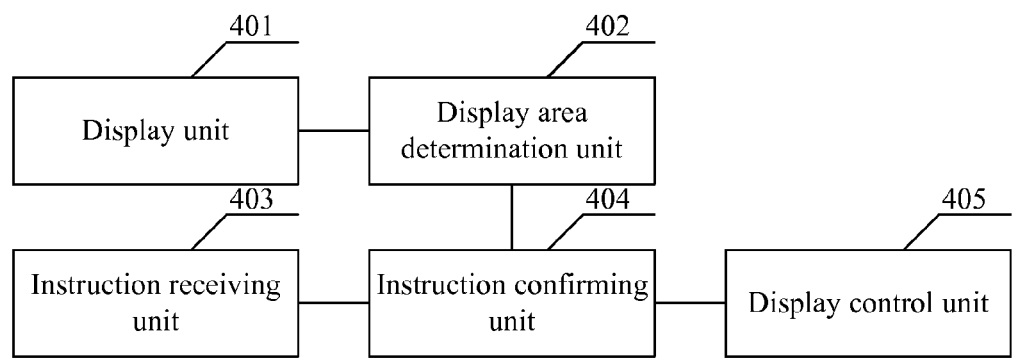
FIG. 4 is a block diagram of a user terminal consistent with various embodiments of the present disclosure.

FIG. 4 shows an exemplary user terminal consistent with the present disclosure. The user terminal includes a display unit 401, a display area determination unit 402, an instruction receiving unit 403, an instruction confirming unit 404, and a display control unit 405.

The display unit 401 may display text boxes. The display area determination unit 402 may determine the display area of a text box. The instruction receiving unit 403 may receive user instructions. The instruction confirming unit 404 may confirm whether a user has entered a quick reply instruction, i.e., making a pull-down gesture exceeding the threshold length in the text box display area. The display control unit 405 may display the quick reply text box when the pull-down gesture exceeds the threshold length in the text box display area.

Embodiments consistent with the present disclosure enable a user terminal to receive a quick reply instruction from a user and implement the corresponding operations. The user does not need to use a mouse or touch screen to click on a text link, an icon, or a button. Embodiments consistent with the present disclosure provide a more user friendly quick reply operation and improve the interaction between a user and a user terminal.

To implement a more intuitive quick reply operation, if the pull-down gesture is in the display area, the display control unit 405 may display a quick reply prompt icon on the top part of the text box before the length of the pull-down gesture reaches the threshold value.

To help the user understand whether the pull-down gesture is sufficient to trigger the quick reply operation, and to quantify the pull-down gesture, the display control unit 405 may implement the following steps. At the beginning of the pull-down gesture, the quick reply prompt icon may be a down-pointing arrow. As the pull-down gesture becomes longer, the arrow may rotate clockwise or counter clockwise. As the length of the pull-down gesture exceeds the threshold, the arrow may rotate to the up-pointing position.

In another example, the display control unit 405 may move the text box display area as well as displaying the quick reply prompt icon as the user makes a pull-down gesture.

Figure 5:
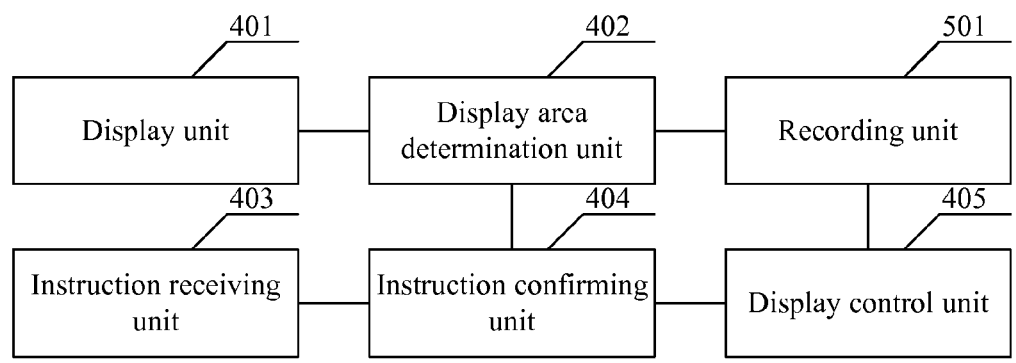
FIG. 5 is another block diagram of a user terminal consistent with various embodiments of the present disclosure.

FIG. 5 shows another exemplary user terminal consistent with the present disclosure. The user terminal includes a display unit 401, a display area determination unit 402, an instruction receiving unit 403, an instruction confirming unit 404, a display control unit 405, and a recording unit 501.

The recording unit 501 may record the original position of a text box. In addition, if the user stops the pull-down gesture before the length of the motion reaches the threshold value, the display control unit 405 may revert to the previous display of the text box, without the quick reply prompt icon. In another example, the display control unit 405 may show the animation of the movements of the text box display area moving back from the temporarily pull-down position (but not enough for the quick reply operation) to its original position.

Figure 6:
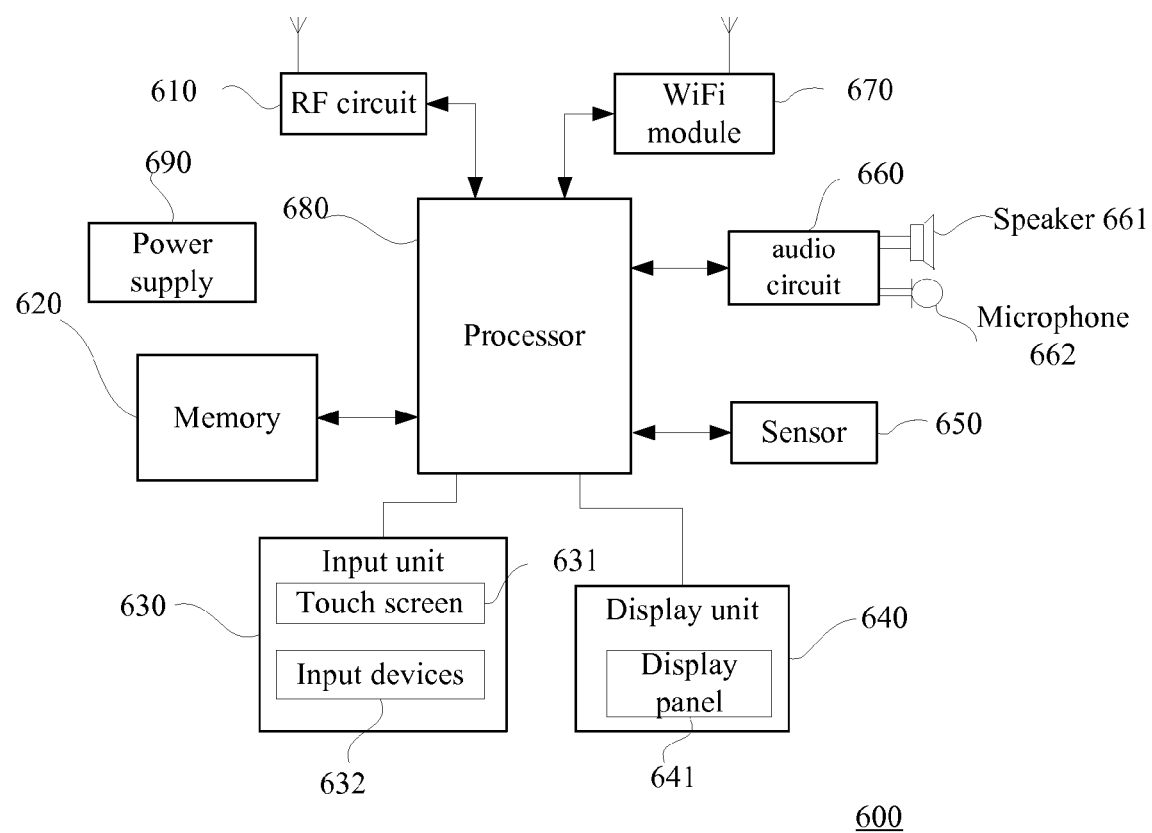
FIG. 6 is an exemplary system for quick reply operations consistent with the present disclosure.

FIG. 6 shows a block diagram of an exemplary user terminal implementing the quick reply operations consistent with the present disclosure. Only components relevant to the embodiments described below are discussed. The details of other components may be disclosed in relation to other embodiments. The user terminal may be a smartphone, a tablet computer, a PDA (Personal Digital Assistant), a POS (Point of Sales), an on-vehicle computer, and other computing devices. For example, FIG. 6 shows an exemplary smartphone implementing the quick reply operations consistent with the present disclosure.

As shown in FIG. 6, the smartphone 600 may include an RF circuit 610, a memory 620, an input unit 630, a display unit 640, a sensor 650, an audio circuit 660, a Wi-Fi module 670, a processor 680, and a power supply 690.

The RF circuit 610 may send and receive data, and/or receive and transmit signals. In particular, after receiving downlink data from a base station, the RF circuit 610 may send the data to processors 680 for further processing. Further, the RF circuit 610 may transmit uplink data to the base station. Usually, the RF circuit 610 includes, but is not limited to, an antenna, at least one amplifier, a tuner, one or more oscillators, a transceiver, a coupler, a Low Noise Amplifier (LNA), a duplexer, etc. In addition, the RF circuit 610 may also communicate with other wireless communication devices and networks. The wireless communication may use any communication standard or protocol, including GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), etc.

The memory 620 may store software programs and modules, such as the data presentation software programs and modules used to implement the embodiments of the present disclosure. The processor 680 may execute the software programs and modules stored in memory 620 to implement functions supporting the quick reply functions consistent with the present disclosure. The memory 620 may include a program storage area and a data storage area. The program storage area may store operating systems, one or more software applications (e.g., for audio or broadcasting functions). The data storage area may include data generated and/or used by the smartphone 600 (e.g., audio or video data). In addition, the memory 620 may include high speed random access memory, non-volatile memory, such as at least one disk storage device, a flash memory device, or other nonvolatile devices. The memory 620 may also include a memory controller, which manages the interactions between the memory 620, the processor 680, and the input unit 630.

The input unit 630 may receive numerical or character data input. The input unit 630 may include components such as keyboards, mice, control bars, optical track balls, touch screens, etc. In particular, the input unit 630 may include a touch screen 631 and the related input devices 632. The touch screen 631 may collect user input from its touch screen surface (e.g., fingers, stylus contact touch screen 631 or its vicinity). The input unit 630 may then initiate the operations of the relevant components based on the input. In one example, the touch screen 631 may include a touch detection means and a touch controller. The touch detection means may check location of the user's touches, detect the signals triggered by the touch motions, and send the signals to the touch controller. The touch controller may receive signals from the touch detection means and convert the signals into contact coordinates, send the contact coordinates to the processor 680, and receive and execute instructions from processor 680. The touch screen 631 may use a variety of resistive, capacitive, infrared and surface acoustic wave touch-sensitive surfaces 631. In addition to the touch screen 631, the input unit 630 may include other input devices 632. In particular, other input devices 632 may include but are not limited to physical keyboards, function keys, track balls, mice, operation bars, etc.

The display unit 640 may display a user's input or act as a graphic interface to present data to the users of the smartphone 600. The graphic interface may include graphics, texts, icons, videos, or combinations thereof. The display unit 640 may include a display panel 641. The display panel may be an LCD, LED, or OLED display. Further, the touch screen 631 may cover the display panel 641. When the touch screen 631 detects contacts on its screen or the vicinity, the touch screen 631 may send the data to the processor 680 to identify the category of the touch contact. The processor 680 may present visual output on the display panel 641 based on the category of the touch contact. In FIG. 6, the touch screen 631 and the display panel 641 are presented as two components for input and output functions. In other embodiments, the touch screen 631 and the display panel 641 may be combined to implement certain input and output functions.

The smartphone 600 includes the sensor 650, which may be an optical sensor, a motion sensor, or other sensors. In particular, an optical sensor may include an ambient light sensor and a proximity sensor. The ambient light sensor may adjust the brightness of the display panel 641 based on the brightness of the ambient light. The proximity sensor may turn off the display panel 641 or its backlight when the smartphone 600 is place close to a user's ear. As a type of motion sensor, the gravity acceleration sensor may detect the acceleration in all directions. When an object is still, the gravity acceleration sensor may detect the magnitude and direction of gravity. This can be used to recognize the position of a smartphone (for functions such as switching screen directions, gyro calibration gestures, etc.) and vibrations (for functions such as pedometer, tapping, etc.). The smartphone 600 may also include a gyroscope, an air pressure sensor, a temperature sensor, an infrared sensor, and other sensors, which are not discussed here.

The audio circuit 660, the speaker 661, and the microphone 662 may provide the audio user interface between a user and the smartphone 600. The audio circuit 660 may send the signals converted from the received audio data to the speaker 661. The speaker 661 may convert the signals to audio signals and output them. The speaker 661 may receive audio signals and convert them to electric signals. These electric signals may be received by the audio circuit 660, and be converted to audio data. The output processor 680 may process the audio data and send the data to another terminal through the RF circuit 610. The output processor 680 may also send the audio data to memory 620 to be further processed. The audio circuit 660 may include a microphone 662, which may enable an external ear phone to connect with the terminal 600.

The smartphone 600, through the transmission module 670, may enable a user to send and receive emails, browse the Internet, and watch streaming media, etc. The transmission module 670 may facilitate fixed wire and wireless broadband connections to the Internet. The smartphone 600 may chose not to include the transmission module 670 based on the specific needs of the embodiments.

The processor 680 is the control center of the smartphone 600. The processor 680 uses interfaces and connections throughout the components of the terminal to operate the software programs stored in memory 620, to process the data stored in memory 620, and to implement the functions of smartphone 600. The processor 680 may include one or more core processors. The processor 680 may integrate an application processor and a wireless communication processor. The application processor may control the operation system, user interface, and application programs. The wireless communication processor may control the wireless communications. The wireless communication processor may also be outside the processor 680.

The smartphone 600 may include the power source 690 (e.g., battery). The power source 690 may use a power management system to connect with processor 680. The power management system may manage the charging, discharging, and other power management functions. The power source 690 may include one or more DC or AC power sources, charging systems, a power failure detection circuit, a power converter or inverter, and a power status indicator.

Even though not shown in FIG. 6, the smartphone 600 may include a camera, a blue tooth module, etc., which are not discussed here. In embodiments consistent with the present disclosure, a smartphone 600 may have a touch screen display. The smartphone 600 may include a memory and one or more software programs stored in the memory. The smartphone 600 may further include one or more processors 680 to execute one or more programs to implement the following functions.

In embodiments consistent with the present disclosure, the processor 680 may display a text box. The processor 680 may determine the display area of the text box. The processor 680 may receive the user instruction to perform a quick reply operation. For example, if the user moves the mouse over the display area of the body of the email message, the user may then use a pull-down gesture in the display area. The processor 680 may determine whether the pull-down gesture has reached the threshold length. When the user stops the pull-down gesture before reaching the threshold length (the arrow next to the "Quick Reply" has not rotated 180 degrees), the smart processor 680 would revert to the original email message display. After the pull-down gesture reaches the threshold length (the arrow next to the "Quick Reply" has rotated 180 degrees), the user may stop the pull-down gesture. The processor 680 may display the quick reply text box.

The processor 680 may receive user instructions and determine whether the instruction is a quick reply action. If so, the processor 680 may move the display of the email message downward and display a quick reply text box. The processor 680 may also display a text such as "Quick Reply" in the text box. The processor 680 may further display an arrow on the left side of the "Quick Reply" text. The down-pointing arrow below the body of the email represents the direction of the user's pull-down gesture.

At the beginning of the pull-down gesture, the original email message is pulled down in response to the pull-down gesture, and the quick reply prompt icon may be a down-pointing arrow. The processor 680 may display the "Quick Reply" text on the right side of the quick reply prompt icon (arrow). As the pull-down gesture becomes longer, the arrow may rotate clockwise or counter clockwise. The degree of the rotation increases as the pull-down gesture extends longer. As the length of the pull-down gesture exceeds the threshold, the arrow may rotate to the up-pointing position.

After the user completes the pull-down gesture, the processor 680 may determine whether the pull-down gesture has reached the threshold length. If not, the processor 680 displays the original email at the original position. That is, when the user stops the pull-down gesture before reaching the threshold length (the arrow next to the "Quick Reply" has not rotated 180 degrees), the processor 680 would revert to the original email message display. Otherwise, the processor 680 may display the quick reply test box. After the pull-down gesture reaches the threshold length (the arrow next to the "Quick Reply" has rotated 180 degrees), the user may stop the pull-down gesture. The processor may display the quick reply text box. The processor may also display a line "To: A" below the reply text box to show the target of the reply message. The processor 680 may also show a "Send" and a "Cancel" button to facilitate the user's operations.

Next, the processor 680 may receive the text of the reply message entered by the user. The processor 680 may also receive an instruction to send the reply from the user and then send the reply message.

The above example describes the example of replying an email message. That is, the processor 680 displays a reply text box based on a user's pull-down gesture. Similarly, the processor 680 may implement the same design for other functions such as "Reply All," "Comment," etc. The processor 680 may display a reply-all or a comment text box based on a user's pull-down gesture.

In the above example, the user terminal determines whether the quick reply screen should be displayed based on a threshold length of the pull-down gesture, or the rotation of the user prompt arrow (180 degrees). Similarly, the user terminal may determine whether the quick reply screen should be displayed based on other criteria, such as whether the pull-down gesture has reached certain part of the display, etc.

Embodiments consistent with the present disclosure enable a user terminal to receive a quick reply instruction from a user and implement the corresponding operations. The user does not need to use a mouse or touch screen to click on a text link, an icon, or a button. Embodiments consistent with the present disclosure provide a more user-friendly quick reply operation and improve the interactions between a user and a user terminal.

Consistent with embodiments of the present disclosure, one or more non-transitory storage medium storing a computer program are provided to implement the system and method for processing quick reply functions. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various quick reply operations can be implemented. For example, in an instant messaging system such as WeChat, a smartphone may implement the embodiments discussed above. The instant messaging system may display a received text message in a text box. A user may use the pull-down gesture to trigger the operations of a quick reply. If the pull-down gesture is in the display area, the smartphone may display a quick reply prompt icon on the top part of the text box before the length of the pull-down gesture reaches the threshold length. If the pull-down gesture is in the display area for the text box, and exceeds the threshold length, the smartphone may display a quick reply text box for the user to compose a reply.

What is claimed is:
1. A method for quick reply operations, comprising:
   displaying a text box in an original position;
   determining a display area of the text box;
   receiving a user instruction;
   determining whether the user instruction is a pull-down gesture in the display area of the text box;
   in response to determining that the user instruction is a pull-down gesture in the display area of the text box, displaying a user prompt icon including a message indicating that a quick reply operation to the text box is to be triggered;
   determining whether the pull-down gesture exceeds a threshold length; and
   in response to determining that the pull-down gesture exceeds a threshold length, displaying a quick reply text box at a position of the user prompt icon to replace the user prompt icon.

2. The method according to claim 1, further comprising:
moving the text box down from the original position as the pull-down gesture lengthens.

3. The method according to claim 2, wherein the user prompt icon further includes an arrow.

4. The method according to claim 3, further comprising:
rotating the arrow from an initial direction as the pull-down gesture lengthens;
wherein a down-ward moving of the text box, a presenting of the message and a rotating of the arrow are performed simultaneously as the pull-down gesture lengthens.

5. The method according to claim 4, wherein:
the initial direction of the arrow points down; and
a final direction of the arrow points up after the pull-down gesture exceeds the threshold length.

6. The method according to claim 2, further comprising:
in response to determining that the pull-down gesture ends and does not exceeds the threshold length:
returning the text box to the original position; and
deleting the user prompt icon.

7. The method according to claim 6, further comprising:
displaying an animation of text box movements as the text box reverts to the original position.

8. The method according to claim 2, wherein:
the position of the user prompt icon is in an upper portion of the display area of the text box.

9. A user terminal for quick reply operations, comprising:
a displaying unit configured to display a text box at an original position;
a display area determination unit configured to determine a display area of the text box;
an instruction receiving unit configured to receive a user instruction;
an instruction confirming unit configured to determine whether the user instruction is a pull-down gesture in the display area of the text box, and to determine whether the pull-down gesture exceeds a threshold length; and
a display control unit configured to:
in response to determining that the user instruction is a pull-down gesture in the display area of the text box, display a user prompt icon including a message indicating that a quick reply operation to the text box is to be triggered, and
in response to determining that the pull-down gesture exceeds a threshold length, display a quick reply text box at a position of the user prompt icon to replace the user prompt icon.

10. The user terminal according to claim 9, wherein the display control unit is further configured to display a down-ward moving of the text box from the original position as the pull-down gesture lengthens.

11. The user terminal according to claim 10, wherein the user prompt icon further includes an arrow.

12. The user terminal according to claim 11, wherein:
the display control unit is further configured to display a rotating of the arrow from an initial direction as the pull-down gesture lengthens;
wherein a down-ward moving of the text box, a presenting of the message and a rotating of the arrow are performed simultaneously as the pull-down gesture lengthens.

13. The user terminal according to claim 12, wherein:
the initial direction of the arrow points down; and
a final direction of the arrow points up after the pull-down gesture exceeds the threshold length.

14. The user terminal according to claim 10, wherein the display control unit is further configured to:
in response to determining that the pull-down gesture ends and does not exceeds the threshold length,
return the text box to the original position; and
delete the user prompt icon.

15. The user terminal according to claim 14, wherein the display control unit is further configured to display an animation of text box movements as the text box reverts to the original position.

16. The user terminal according to claim 10, wherein the position of the user prompt icon for quick reply is in an upper portion of the display area of the text box.

* * * * *